United States Patent [19]
Ford et al.

[11] 3,885,590
[45] May 27, 1975

[54] GAS TRANSMISSION AND MONITORING DEVICE

[75] Inventors: John L. Ford; John Serafin, both of Phoenix, Ariz.

[73] Assignee: Serefor Industries, Inc., Phoenix, Ariz.

[22] Filed: May 10, 1974

[21] Appl. No.: 468,653

[52] U.S. Cl. ............... 137/613; 128/2 R; 128/184; 137/505.11
[51] Int. Cl. .................. G05d 11/00; F16k 45/00
[58] Field of Search ...... 137/613, 494, 115, 505.11, 137/113; 128/184, 303 R, 2 R, 2 A, 2.05 D, 2.05 E, 2.07, DIG. 7; 251/61.5

[56] References Cited
UNITED STATES PATENTS

| | | | |
|---|---|---|---|
| 2,088,685 | 8/1937 | Birch | 137/505.11 |
| 2,441,237 | 5/1948 | Davies | 128/2 R |

Primary Examiner—Martin P. Schwadron
Assistant Examiner—Robert J. Mulller
Attorney, Agent, or Firm—Don J. Flickinger; Drummond, Nelson & Ptak

[57] ABSTRACT

A compact self-contained flow and pressure regulator device for transmitting and monitoring gas from a source of compressed gas to a body cavity during surgery. The device includes a selectively adjustable pressure regulator for controlling the gas received from the source, a limiting orifice to attenuate the flow rate and an off-on valve. An adjustable pressure valve controls the discharge gas pressure which is indicated on a gauge. A safety relief valve is included in the device.

1 Claim, 4 Drawing Figures

3,885,590

SHEET 3

GAS TRANSMISSION AND MONITORING DEVICE

This invention relates to gas transmission and monitoring devices.

In a further aspect, the invention relates to gas transmission and monitoring devices for receiving gas from a source of compressed gas of random pressure and flow rate and discharging gas at a known pressure and flow rate.

More specifically, the instant invention concerns a gas transmission and monitoring device especially adapted for surgical use to supply gas to a body cavity.

For study and diagnosis of the various organs and tissues of the abdominal and pelvic cavities, medical surgeons perform an operation known as a "peritoneoscopy." In this procedure, a laparotomy or surgical section of the abdominal wall is done for the insertion of a peritoneoscope. The peritoneoscope, which has an optical and lighting system for examining the body cavity, is generally inserted through a relatively minor incision. To provide room for the peritoneoscope to move about, the peritoneal cavity is expanded by the introduction of gas, generally carbon dioxide ($CO_2$).

Expansion of the peritoneal cavity, in addition to competent medical skills, requires precise gas transmission and monitoring equipment. Conventionally, the equipment is an ungainly assemblage of valves and regulators which are transported upon an especially constructed cart. Prior to use, the equipment is positioned near the patient and connected with suitable tubing to a tank of $CO_2$ which is carried upon a separate cart. The $CO_2$ is discharged through another tube to a needle which delivers the gas to the peritoneal cavity.

After the equipment is adjusted to obtain the initial flow rate and pressure, the doctor inserts the needle through the patient's skin to probe for the peritoneal cavity. For obvious reasons, the needle must completely penetrate the skin and peritoneum but none of the internal organs to deliver gas to the cavity. Heretofore, no satisfactory method has been devised to continuously detect the location of the discharge end of the needle.

Having positioned the needle, the doctor readjusts the flow rate and pressure to discharge gas into the peritoneal cavity to expand the cavity in preparation for the insertion of the peritoneoscope. During the surgical examination, the doctor or a qualified assistant must constantly monitor the gas transmission device by referring to the pressure and flow rate gauges to maintain the desired inflation or discontinue the gas stream in case of a malfunction of the equipment. Attendance of the gas transmission and monitoring equipment is further complicated since the surgical procedure is conducted in a darkened room to afford the doctor advantageous viewing with the peritoneoscope.

It would be highly advantageous, therefore, to provide a simplified gas transmission and monitoring device for use in connection with surgical procedures.

Accordingly, it is a principal object of the present invention to provide a compact self-contained flow and pressure regulator device for monitoring gas transmission.

Another object of the present invention is the provision of a gas flow and pressure regulator device especially adapted for monitoring gas transmission from a source of compressed gas to a human body cavity as during a peritoneoscopy.

Still another object of the present invention is the provision of a gas transmission and monitoring device sufficiently compact to be directly attached to a cylinder of compressed gas and transported therewith.

Yet another object of the present invention is to provide a gas flow and pressure regulator device which is exceedingly simple to initiate and use with a minimum of manual manipulation.

A further object of the present invention is the provision of a device of the above type which will assist the doctor in locating the peritoneal cavity and is especially adapted for use in darkened areas.

Yet a further object of the present invention is to provide a device of the above type which is relatively economical to manufacture and exceedingly reliable in operation.

Briefly, to achieve the desired objectives of the present invention, in accordance with a preferred embodiment thereof, first provided is a housing enclosing a gas transmission conduit having an inlet and an outlet. The inlet is adapted for connection to a source of pressurized gas as might be provided by a cylinder of $CO_2$, while the outlet is adapted for connection to a gas delivery conduit such as a piece of surgical tubing. Gas entering the gas transmission conduit is first controlled by a selectively adjustable pressure regulator and then attenuated by a limiting orifice. An adjustable control valve, normally preset to desired pressure and flow rate, exercises final control over the gas delivered to the outlet. A gauge constantly indicates the discharge gas pressure.

A relief valve provides an automatic safety for the system. If the flow rate or pressure exceeds a predetermined maximum, the gas is discharged through the relief valve which is tuned to emit an audible warning. A two-position switch permits selective discontinuance of gas flow through the gas transmission conduit.

The foregoing and further and more specific objects and advantages of the present invention will be come apparent to those skilled in the art from the following detailed description thereof taken in conjunction with the drawings, in which.

Figure 1:
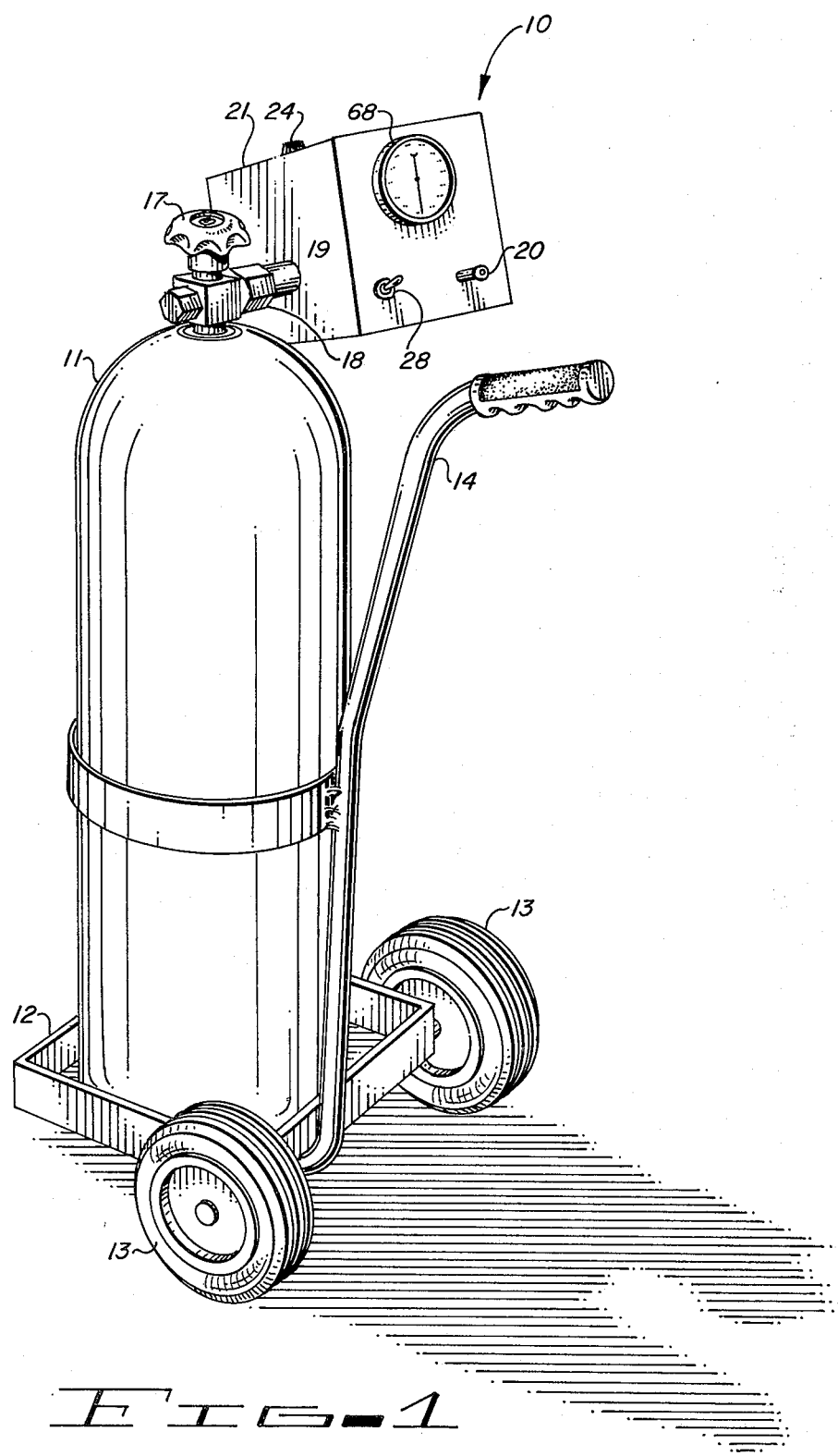
FIG. 1 is a perspective view of a gas transmission and monitoring device constructed in accordance with the teachings of the present invention as it would appear when attached to a tank of compressed gas.

Turning now to the drawings, in which the same reference numerals indicate corresponding elements throughout the several views, attention is first directed to FIG. 1, which shows the gas transmission and monitoring device of the present invention generally designated by the reference character 10 attached to a source of compressed gas represented by a cylinder of $CO_2$ 11. As illustrated, the cylinder 11 is provided with a cart 12 having wheels 13 and a handle 14 upon which the cylinder is borne during storage, transportation and use. The cylinder 11, as supplied by the vendor, has a control valve 17 and a union 18. The gas transmission and monitoring device 10 has a gas transmission conduit therein which is represented by the inlet end 19 and the outlet end 20 thereof. The inlet end 19 is provded with threads or other suitable engaging means for connection to the cylinder 11 by the union 18. The outlet end 20 is shaped and sized for connection to a surgeon's equipment, not herein shown but generally including a length of flexible conduit such as tubing with a needle attached at one end thereof.

Figure 2:
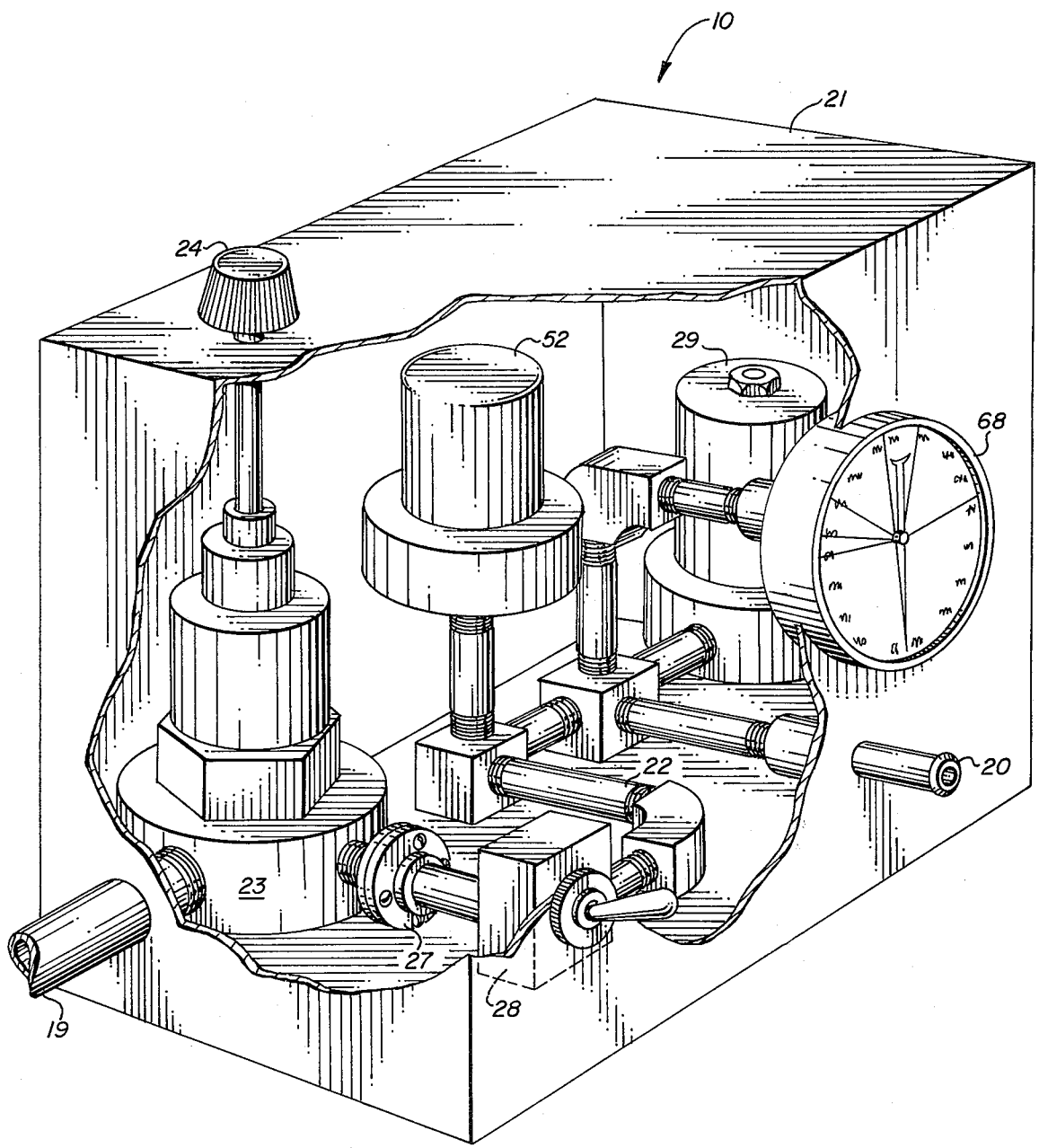
FIG. 2 is an enlarged perspective view of the gas transmission and monitoring device of FIG. 1 with the housing partly broken away to reveal the components thereof.
Figure 3:
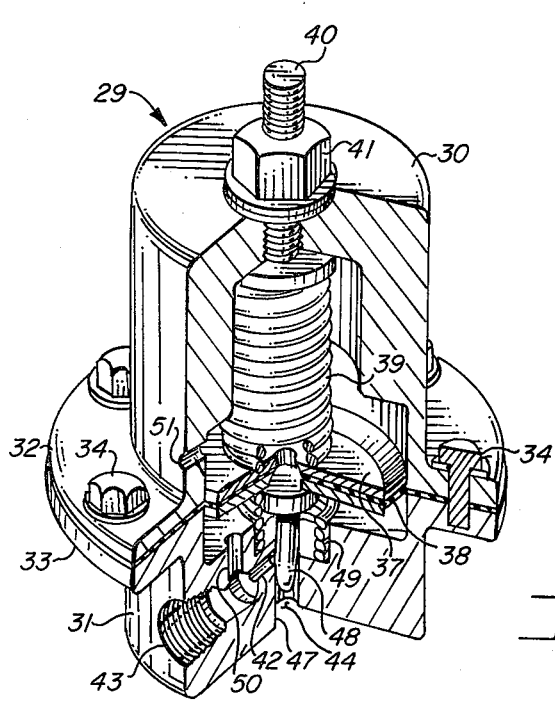
FIG. 3 is a perspective view, partly in section, of a control valve assembly useful in practicing the present invention.

FIG. 2 shows the gas transmission and monitoring device 10 having a housing 21. A gas transmission conduit 22 within the housing 21 communicates between an inlet end 19 and an outlet end 20 extending beyond the housing. A selectively adjustable pressure regulator or reduction valve 23 operatively associated with adjusting knob 24 external the housing 21 controls the gas pressure transmitted from the cylinder 11 to the gas transmission conduit 22. A limiting orifice 27 downstream of the pressure regulator 23 attenuates the flow rate. A two-position (on-off) selective valve 28 provides for immediate manual discontinuance of gas flow through the conduit 22. The adjustable pressure regulator 23, the limiting orifice 27 and the selective valve 28 are commercially available and will not be described in detail herein. The selected pressures and flow rates associated with each component will be described hereinafter in detail in connection with the operation of the gas transmission and monitoring device 10. A selectively adjustable control valve 29, as illustrated in detail in FIG. 3, is the ultimate control for the gas discharged through the outlet 20. The control valve 29 includes a housing 30 and a cover member 31 which are secured with a plurality of flanges 32 and 33. A plunger 37 is carried by a radially extending diaphragm 38 which is secured between the flanges 32 and 33. Within the housing is a spring 39 having one end thereof bearing against the plunger 37 and the other end thereof bearing against an adjusting screw 40. The adjusting screw 40 adjusts the tension on the spring 39 and is maintained after adjustment by a lock nut 41. Within the cover member 31 is a gas inlet port 42 having an enlarged threaded portion 43 which is adapted for connection to the gas transmission conduit 22. A gas escape port 44 communicates with the inlet port 42 through a seat 47 and a movable needle 48. The needle 48 is normally urged upwardly against the plunger 37 by a spring 49. The conduit 50 provides that gas pressure within the inlet port 42 bears against the underside of the plunger 37. It is noted that the interior of the housing 30 is vented to the atmosphere through opening 51.

Figure 4:
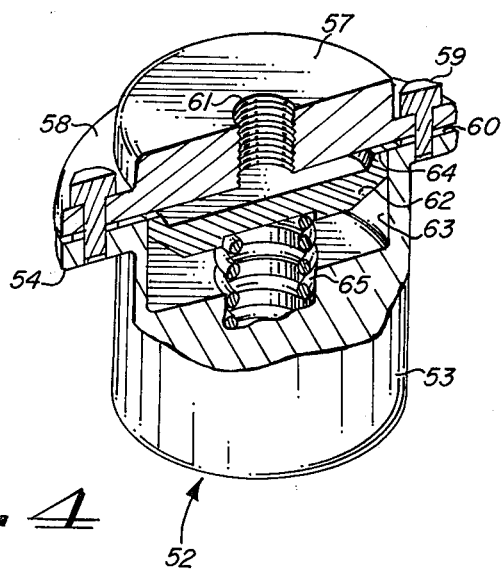
FIG. 4 is a perspective view, partly in section, of a relief valve assembly useful in the device of FIG. 2.

A relief valve 52, as illustrated in detail in FIG. 4, is automatically activated in response to failure of one of the previously described components. The relief valve 52 has a generally cylindrical housing 53 with a flange 54 at one end thereof and an end cap 57 having a flange 58. The housing 53 and the end cap 57 are connected by bolts 59 extending through the corresponding flanges 54 and 58. Spacers 60, which are preferably annular members encircling each bolt 59, provide a continuous space between the housing 53 and the end cap 57. The threaded aperture 61 within the end cap 57 is used to secure the relief valve to the gas transmission conduit 22 and is also a gas inlet port. A plunger 62 slidable within the bore 63 of the housing 53 has an annular sealing surface 64 which mates with the end cap 57. Spring 65, carried within the housing 53, exerts a specified pressure upon the plunger 62 to provide a normally air-tight seal between the sealing surface 64 and the end cap 57. Plunger 62 is in constant communication with the gas within gas transmission conduit 22. When the force of the gas exceeds the compression rate of spring 65, the plunger is urged away from end cap 57 into bore 63. The gas then escapes through the space between the housing 53 and the end cap 57. The escaping gas creates an audible vibration within the relief valve. Gauge 68 provides a continuous visual display of the gas pressure within the device.

The function of each of the various elements and the operation of the gas transmission and monitoring device of the present invention will now be described in detail. The flow rates and pressures under consideration are given in liters per minute (1/min.) and centimeters of water (cm/$H_2O$), respectively. Preferably, the gauge face is calibrated by fives from 0 to 50, 0 and 50 being a common line and the numbers corresponding to gas pressure in the transmission conduit 22, as represented by cm/$H_2O$. Superimposed upon the gauge face are colored zones for quick reference. Zone 1 is white and extends from 0 to 14.5; zone 2 extending from 14.5 to 15.5 is yellow; and zone 3 which is white extends from 15.5 to 18.0. Zone 4, being light green, extends from 18.0 to 30.0 and includes dark green zone 4a between 24 and 26. Zone 5 is white and extends from 30 to 35. From 35 to 50, or the terminal point 0, is zone 6 which is identified as red.

The gas transmission and monitoring device 10 is considered to be integral with the cylinder 11 since the device 10 is stored and transported with the cylinder 11 and since the device 10 is changed from an emptied tank 11 to a full tank by a technician between uses and presented to the doctor as an integral unit. The doctor commences use by first attaching a length of tubing to the outlet 20. A needle, generally about 18 gauge size, is affixed to the free end of the tubing. After opening the valve 17 to permit the compressed $CO_2$ to flow from the cylinder 11 through the inlet 19 into the gas transmission conduit 22, the selective valve 28 is turned to the "on" or open position. The pressure regulator 23 is now adjusted by turning knob 24 until the gauge indicates in area 2. In addition to being modulated by the pressure regulator 23, the gas flows through the limiting orifice 27 which is 0.018 inch in diameter and limits the flow to 1.3 1/min. The gas discharged through the needle after being normalized for internal resistance within the system has a flow rate of 1.3 1/min. with a pressure of approximately 15 cm/$H_2O$. The discharge pressure of 15 cm/$H_2O$ approximates the internal resistance of human body tissue. Therefore, as the doctor begins to probe through the skin and outer tissues for the peritoneal cavity, the tissues will stop the flow of gas and cause a rise in pressure to be indicated on the gauge 68. As the tip of the needle enters the peritoneal cavity, the indicated pressure will suddenly drop. In this way, the surgeon, by watching the gauge, can determine when he has penetrated the covering tissues and entered the peritoneal cavity.

When it has been determined that gas is flowing into the peritoneal cavity, it is no longer necessary to make further adjustments. The flow rate has already been regulated within the yellow zone and the operating pressure will not exceed 25 cm/$H_2O$. As the peritoneal cavity expands, in response to the inflow of gas, the pressure will continuously build. The build in pressure will be reflected by the gauge 68. When the gauge indicates a pressure in area 4a of approximately 25 cm/H$_2$O, which corresponds to the desired expansion of the peritoneal cavity, gas flow control of the system will be relinguished to control valve 29. Control valve 29 is pre-adjusted to a pressure of 25 cm/H$_2$O. The control valve 29 will respond to flows and pressures greater than the preset condition and proportionately withdraw needle 48 from seat 47 through opened escape port 44 to maintain the desired gas conditions during the operation.

Relief valve 52 is a safety device should a malfunction occur in limiting orifice 27 or control valve 29. The normally closed relief valve opens in response to gas exhibiting pressure and flow greater than 35 cm/H$_2$O at 1.3 l/min. The relief valve is tuned to provide an audible vibration when discharging gas. The sound provides an excellent warning signal, especially in the darkened room. Corrective action by the doctor can include immediate discontinuance of gas by turning the selective valve 28 to the "off" or closed position.

Having fully disclosed and described the present invention and the preferred embodiment thereof in such clear and concise terms as to enable those skilled in the art to understand and practice the same, the invention claimed is:

1. A compact, self-contained flow and pressure regulator device having manual and automatic safety means for monitoring gas transmission from a source of compressed gas to a human body cavity during a peritoneoscopy, said regulator device comprising:

a. a housing having an inlet and an outlet and a gas transmission conduit communicating therebetween, said inlet adapted for connection to a source of pressurized gas, said outlet adapted for connection to a gas delivery conduit;

b. a selectively adjustable pressure regulator proximate the inlet end of said gas transmission conduit for modulating the pressure of said gas entering said conduit from said pressurized source;

c. a limiting orifice for receiving said gas from said adjustable pressure regulator and reducing the flow of said gas to a predetermined rate;

d. a control valve downstream of said adjustable pressure regulator and said limiting orifice for maintaining said gas below a predetermined rate of flow and pressure;

e. a relief valve operatively associated with said gas transmission conduit between said orifice and said outlet for the escape of gas therethrough when the gas in said conduit exceeds a predetermined maximum pressure or flow rate, said relief valve opening in response to a pressure and flow rate which is higher than the values maintained by said control valve;

f. gauge means for indicating gas conditions in said gas transmission conduit; and g. valve means for selectively discontinuing the discharge of gas from said outlet.

* * * * *